(12) United States Patent
Buannic et al.

(10) Patent No.: US 12,068,448 B2
(45) Date of Patent: Aug. 20, 2024

(54) METHOD FOR FORMING A LI-ION BATTERY CELL

(71) Applicant: Renault s.a.s., Boulogne-Billancourt (FR)

(72) Inventors: Lucienne Buannic, Suresnes (FR); Mohamed Chakir, Saint Germain les Arpajon (FR); Pedro Lopez, Madrid (ES)

(73) Assignee: Renault s.a.s., Boulogne-Billancourt (FR)

( * ) Notice: Subject to any disclaimer, the term of this patent is extended or adjusted under 35 U.S.C. 154(b) by 484 days.

(21) Appl. No.: 17/605,317

(22) PCT Filed: Apr. 2, 2020

(86) PCT No.: PCT/EP2020/059431
§ 371 (c)(1),
(2) Date: Oct. 21, 2021

(87) PCT Pub. No.: WO2020/216597
PCT Pub. Date: Oct. 29, 2020

(65) Prior Publication Data
US 2022/0216504 A1    Jul. 7, 2022

(30) Foreign Application Priority Data

Apr. 25, 2019 (FR) ..................... 19 04343

(51) Int. Cl.
| | | |
|---|---|---|
| *H01M 10/0525* | (2010.01) | |
| *H01M 4/485* | (2010.01) | |
| *H01M 4/62* | (2006.01) | |
| *H01M 10/04* | (2006.01) | |
| *H01M 10/056* | (2010.01) | |
| *H01M 10/44* | (2006.01) | |
| *H01M 4/02* | (2006.01) | |

(52) U.S. Cl.
CPC ....... *H01M 10/0525* (2013.01); *H01M 4/485* (2013.01); *H01M 10/056* (2013.01); *H01M 10/446* (2013.01); *H01M 2004/028* (2013.01); *H01M 4/625* (2013.01); *H01M 10/0436* (2013.01); *H01M 2300/0091* (2013.01)

(58) Field of Classification Search
None
See application file for complete search history.

(56) References Cited

U.S. PATENT DOCUMENTS

| | | |
|---|---|---|
| 2019/0051934 A1 | 2/2019 | Kim et al. |
| 2019/0074704 A1 | 3/2019 | Krasovitsky et al. |

OTHER PUBLICATIONS

International Search Report issued on May 29, 2020 in PCT/EP2020/059431 filed Apr. 2, 2020, 2 pages.

*Primary Examiner* — Carlos Barcena
(74) *Attorney, Agent, or Firm* — Oblon, McClelland, Maier & Neustadt, L.L.P.

(57) ABSTRACT

A Li-ion battery cell includes cathode and anode materials, a separator, and an electrolyte including a mixture of a polyethylene oxide and an oxide of formula $Li_vLa_sZnO_n$. A method of forming the cell includes the following successive cycling steps: (a) at least two successive charge and discharge cycles of the cell at a first cycling rate C/x, the charge/discharge steps being limited in time to x/2; (b) at least two successive charge and discharge cycles of the cell at a second charging rate C/y, different from the first cycling rate, where y is lower than x, the charge/discharge steps being limited in time to y/2; and (c) at least two successive charge and discharge cycles of the cell at a third cycling rate C/z different from the first and second charging rates, where z is lower than x and y, the charge/discharge steps being limited in time to z/2.

14 Claims, 4 Drawing Sheets

METHOD FOR FORMING A LI-ION BATTERY CELL

The present invention relates generally to rechargeable lithium ion (Li-ion) batteries, and more precisely the cells of all-solid Li-ion batteries comprising a mixture of polyethylene oxide and an oxide of formula $Li_7La_3Zr_2O_{12}$ (PEO-LLZO).

More particularly, the invention relates to a method for forming a Li-ion battery cell comprising a PEO-LLZO mixture.

Electrochemical systems for energy storage have important applications in the field of portable electronics and electric vehicles. One of the most used battery technologies is based on the use of lithium ions.

Conventionally, a Li-ion battery is an assembly of one or more negative and positive electrodes, anodes and cathodes respectively, an electrolyte and a separator preventing any contact between the electrodes.

Once the Li-ion battery cell is activated, i.e. when the cell has been assembled and the liquid electrolyte is impregnated in the cell, thermodynamic reactions take place during the first cell charging cycle, and the first exchanges of lithium ions between the electrodes take place.

Products resulting from these reactions accumulate on the surface of the electrodes to form a layer called a solid-electrolyte interface (solid electrolyte interphase) or SEI layer. This layer is an essential element for the proper operation of the Li-ion battery as it conducts the lithium ions very well and offers the advantage of stopping catalytic decomposition of the solvent of the liquid electrolyte.

The quality of the SEI determines the service life of the battery, and its formation is therefore an important step.

In a new generation of batteries, the separator and the liquid electrolyte are replaced with a solid electrolyte, which is for example a polymer, an inorganic compound, an amorphous material or a combination of these various materials.

The all-solid battery provides greater safety since it does not comprise any flammable material.

Moreover, its energy density is far greater than the energy density of a liquid electrolyte battery.

The solid electrolyte is incorporated directly in the electrodes in the form of powder during coating of them, and is called catholyte in the cathode and anolyte in the anode.

However, the manufacture of completely solid batteries is still complicated on an industrial scale and an intermediate solution is to use electrolytes made of materials that are both flexible and are ionic conductors, such as certain polymers, for example such as polyethylene oxide (PEO).

Although the manufacture of batteries comprising polymers that are conductive for lithium ions is simple and fully mastered, their use is still not widespread, as it comes up against a fundamental limitation.

In fact, these polymers are not stable at high potential. For example, PEO is only stable up to a potential of 3.6V. Now, the potential necessary so that the active materials forming the electrodes reach the energy densities required for applications in the automotive field is between 3.7V and 5V.

Document US 2018/0006326 describes an all-solid Li-ion battery comprising a polymer material. In particular, a battery electrode comprising PEO and an oxide of formula $Li_{6.5}La_3Zr_{21.5}Ta_{0.5}O_{12}$ is disclosed.

However, that document does not disclose a method for forming a battery cell making it possible to stabilize the polymer to improve battery performance at high potentials.

The aim of the invention is therefore to overcome these drawbacks and propose a method for forming an all-solid Li-ion battery cell comprising a PEO-LLZO solid electrolyte endowing the polymer with stability at high potentials, between 3.7V and 5V.

A method is therefore proposed for forming a Li-ion battery cell comprising a cathode material, an anode material, and a solid electrolyte, the electrolyte comprising a mixture of a polyethylene oxide and an oxide of formula $Li_7La_3Zr_2O_{12}$. The method comprises the following successive cycling steps: (a) at least two successive charge/discharge cycles of the cell at a first cycling rate C/x, the charge/discharge steps being limited in time to x/2; (b) at least two successive charge/discharge cycles of the cell at a second charge rate C/y, different from the first cycling rate, where y is lower than x, the charge/discharge steps being limited in time to y/2; and (c) at least two successive charge/discharge cycles of the cell at a third cycling rate C/z different from the first and second charge rates, where z is lower than x and y, the charge/discharge steps being limited in time to z/2.

Charge/discharge cycle means a step comprising a charge and then a discharge. Consequently, successive charge/discharge cycles represent a cycle comprising a charge and then a discharge, followed by one or more other cycles, each also comprising a charge and a discharge.

The method for forming a cell according to the invention makes it possible to stabilize the composite electrolyte and improve the electrochemical performance of the all-solid Li-ion battery.

Other aims, advantages and features will become clear from the description given hereunder, which is provided purely for purposes of illustration, referring to the appended drawings in which.

Figure 1:
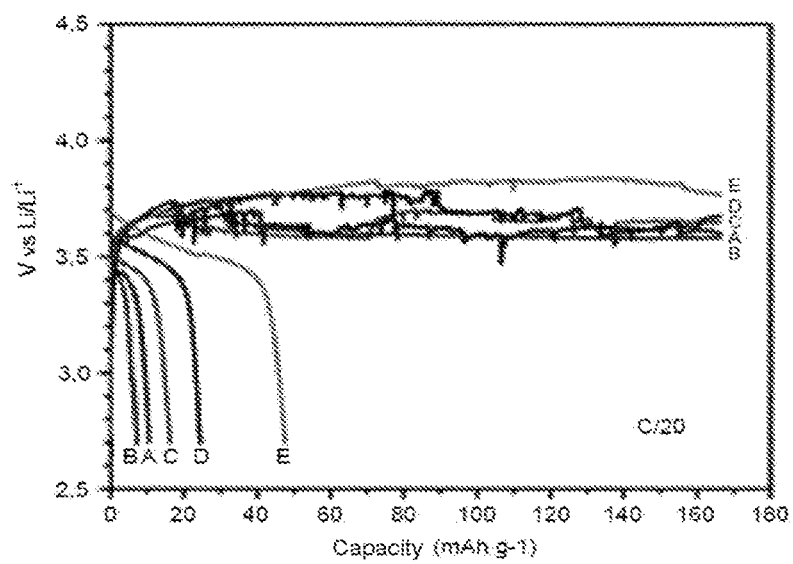
FIG. 1 shows the variation of the voltage as a function of the capacity of the cell that has not undergone any preconditioning during five successive charge/discharge cycles at a cycling rate of C/20.

All-solid Li-ion batteries generally comprise a cathode, an anode and a solid electrolyte.

The method of formation according to the invention relates to a Li-ion battery cell comprising a solid electrolyte comprising a mixture of polyethylene oxide (PEO) and oxide of formula $Li_7La_3Zr_2O_{12}$ (LLZO).

Preferably, the anode comprises lithium metal.

According to a preferred embodiment, the electrolyte comprises a lithium salt, for example lithium bis(trifluoromethanesulfonyl)imide (LiTFSI).

The cathode is prepared by mixing an active material, a catholyte and a filler of active material.

Preferably, the active material comprises a material of formula $LiNiMnCoO_2$, corresponding to a mixture of nickel, manganese and cobalt such as, for example, NMC622.

The filler of active material may comprise carbon black, for example carbon black C65.

The catholyte preferably comprises a mixture of polyethylene oxide and oxide of formula $Li_7La_3Zr_2O_{12}$.

Preferably, the catholyte further comprises lithium bis(trifluoromethanesulfonyl)imide, thus advantageously forming a PEO-LiTFSI:LLZO mixture.

The method for forming a Li-ion battery cell according to the invention comprises a step of preconditioning of the cell comprising at least three successive steps (a), (b) and (c).

Step (a) comprises at least two successive charge/discharge cycles of the cell at a first cycling rate C/x, each charge/discharge step being limited in time to x/2, step (b) comprises at least two successive charge/discharge cycles of the cell at a second charge rate C/y different from the first cycling rate, where y is lower than x, each charge/discharge step being limited in time to y/2, and step (c) comprises at least two successive charge/discharge cycles of the cell at a third cycling rate C/z different from the first and second charge rates, where z is lower than x and y, each charge/discharge step being limited in time to z/2.

It was found, surprisingly, that the preconditioning of the cells comprising at least the three steps (a), (b) and (c) as described above allows formation of an SEI on the surface of the cells, the quality of which helps to stabilize the polymer with which the cell is provided.

In particular, it was observed that the stability of the polymer at high battery operating potentials, between 3.7V and 5V, was improved. The battery performance and in particular the energy density are thus improved.

Advantageously, the successive cycling steps are carried out at an increasing cycling rate.

Advantageously, the cycling rate during cycling step (a) is C/40 and the cycling rate during cycling step (b) is C/20.

The cycling rate or "charge or discharge rate" is designated C/n, where C is the capacity of the battery in A.h, i.e. the amount of electrical energy that it is capable of returning after receiving a full charge and where n refers to a time in h.

Advantageously, the cycling rate during cycling step (c) is C/10.

Preferably, the method for forming the Li-ion battery cell further comprises a successive step (d) comprising at least two successive charge/discharge cycles of the cell at a fourth cycling rate different from the first, second and third charge rates.

Advantageously, the cycling rate during cycling step (d) is C/5.

According to a preferred embodiment, the method for forming the Li-ion battery cell further comprises a successive step (e) comprising at least two successive charge/discharge cycles of the cell at a fifth cycling rate different from the first, second, third and fourth charge rates.

Advantageously, the cycling rate during cycling step (e) is C/2.

Preferably, one or more of the cycling steps (a), (b), (c), (d) and (e) comprise at least five successive charge/discharge cycles of the cell.

During the various preconditioning steps, the duration of each charge/discharge cycle carried out at a cycling rate of C/n is preferably equal to n/2.

The present invention is illustrated in a nonlimiting manner by the following examples of the method for forming a Li-ion cell.

EXAMPLE 1

1. Preparation of the Cell

The Solid Electrolyte

The electrolyte used is prepared by mixing polyethylene oxide (PEO), the oxide of formula $Li_7La_3Zr_2O_{12}$ (LLZO) and a lithium salt, lithium bis(trifluoromethanesulfonyl)imide (LiTFSI).

The percentage by volume of PEO-LiTFSI is 90 vol % and the percentage by volume of LLZO oxide is 10 vol %.

The Anode

The anode is formed from lithium metal.

The Cathode

The cathode is prepared by mixing an active material, a catholyte and an electron conductor.

NMC622 of formula $LiNi_{0.6}Mn_{0.2}Co_{0.2}O_2$ is selected as the active material and corresponds to a nickel-manganese-cobalt mixture comprising 60 mol % of nickel, 20 mol % of manganese and 20 mol % of cobalt.

Carbon black C65 is selected as the electron conductor.

Furthermore, the cathode comprises a catholyte comprising polyethylene oxide, the oxide of formula $Li_7La_3Zr_2O_{12}$ and lithium bis(trifluoromethanesulfonyl)imide to form a PEO-LiTFSI:LLZO mixture.

The proportions of NMC622, carbon black C65 and catholyte in the cathode are shown in Table 1. The amount of NMC622 present at the cathode is adjusted in order to obtain a surface capacity of 1.6+0.6 $mAh.cm^{-2}$, assuming a theoretical capacity of 166 mAh/g for NMC622.

TABLE 1

|  | NMC622 | Carbon black | Catholyte |
|---|---|---|---|
| Percentage by weight (wt %) | 74 | 6 | 20 |
| Percentage by volume (vol %) | 50 | 10 | 40 |

Cell Assembly

A 16 mm dia. electrolyte disk and a 13 mm dia. cathode disk are assembled before being added to a 14 mm dia. anode disk to form a cell.

2. Galvanostatic Cycling, Evaluation and Result

A series of five charge/discharge cycles is carried out on the cell obtained according to the method of formation described in paragraph 1, at a rate of C/20. The cycling tests are carried out at 70° C. and in a voltage window between 2.7V and 4.2V.

In FIG. 1, curves A, B, C, D and E correspond respectively to the variation of the voltage as a function of the capacity of the cell during the first, second, third, fourth and fifth charge/discharge cycles.

It is noted that there is instability of the voltage during the charge cycles beyond 3.7V. During discharge, the capacity reaches on average 43 mA.h.g$^{-1}$, or only 26% of the expected experimental capacity for a cell comprising NMC622 as active material, which is 166 mA.h.g$^{-1}$.

Five additional charge/discharge cycles are carried out on the cell at a cycling rate of C/20, during which the capacity slowly increases until it reaches 85 mA.h.g$^{-1}$.

Figure 2:
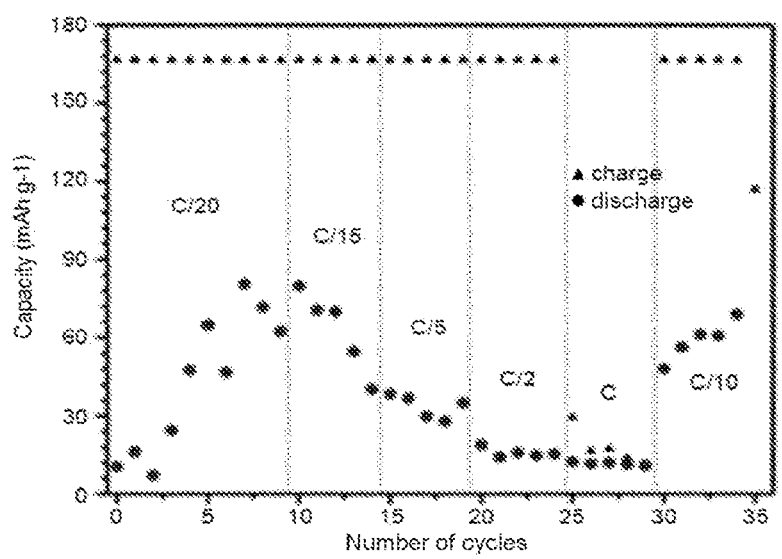
FIG. 2 shows the variation of the capacity of the cell that has not undergone any preconditioning as a function of the number of charge/discharge cycles, at different cycling rates.

As can be seen in FIG. 2, which shows the variation of the capacity of the cell as a function of the number of cycles at rates of C/20, C/10, C/5, C/2 and 1 C, the values of discharge capacity at C/20 are similar to a cycling rate of C/10 but gradually decrease as the capacity level C increases, i.e. about 20 mA.h.g$^{-1}$ at C/2 and 1 C.

The voltage instability observed during the first charge/discharge cycles can be explained by the degradation of the composite electrolyte and, in particular, of the polyethylene oxide.

EXAMPLE 2

1. Preparation of the Cell

The method of preparation of the cell described in detail in example 1 is reproduced for the method of preparation of the cell in example 2. Furthermore, an additional step of preconditioning of the cell, described further hereunder, is carried out.

Preconditioning

The cell is prepared according to a first embodiment of preconditioning. Two charge/discharge cycles are carried out at a first cycling rate of C/40 according to a first step (a).

Each charge/discharge cycle of step (a) is carried out for 20 hours.

In a second step (b), two charge/discharge cycles are carried out at a second cycling rate of C/20, where each cycle is carried out for 10 hours.

Finally, in a third and final step (c), two charge/discharge cycles are carried out at a third cycling rate of C/10, where each cycle is carried out for 5 hours.

Figure 3:
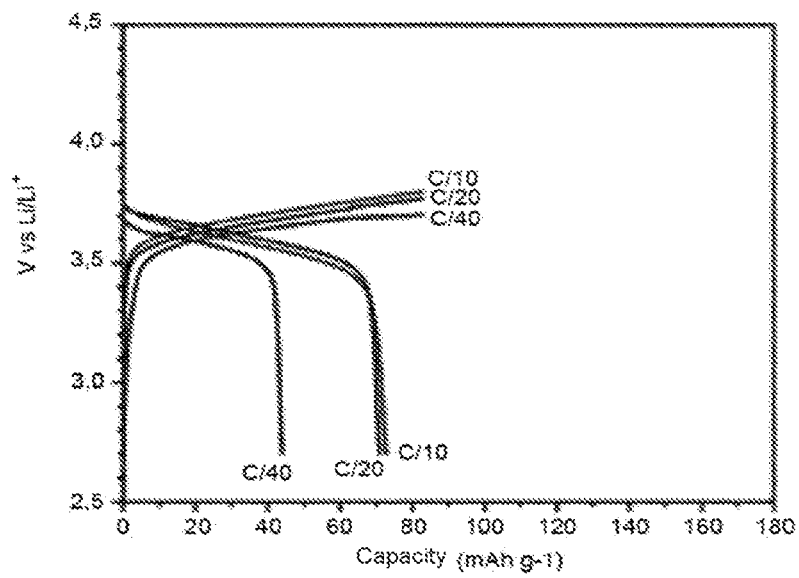
FIG. 3 shows the variation of the voltage as a function of the capacity of the cell during the cycling steps of preconditioning of the cell according to a first embodiment.

The variation of the voltage as a function of the capacity of the cell during the cycling steps of preconditioning according to the first embodiment is shown in FIG. 3. It can be seen that the results obtained during this preconditioning show better stability in comparison with the results in example 1. The voltage reached is 3.8V.

2. Galvanostatic Cycling, Evaluation and Result

Figure 4:
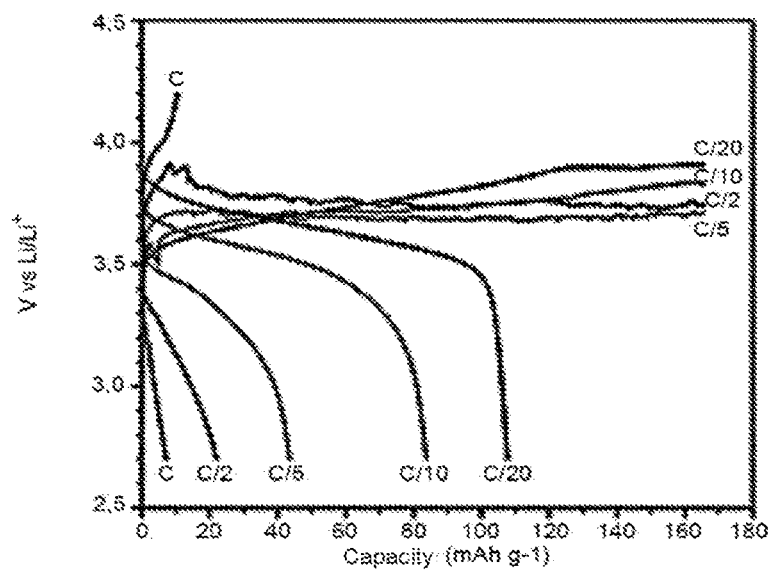
FIG. 4 shows the variation of the voltage as a function of the capacity of the cell that has undergone preconditioning according to the first embodiment, at different cycling rates.
Figure 5:
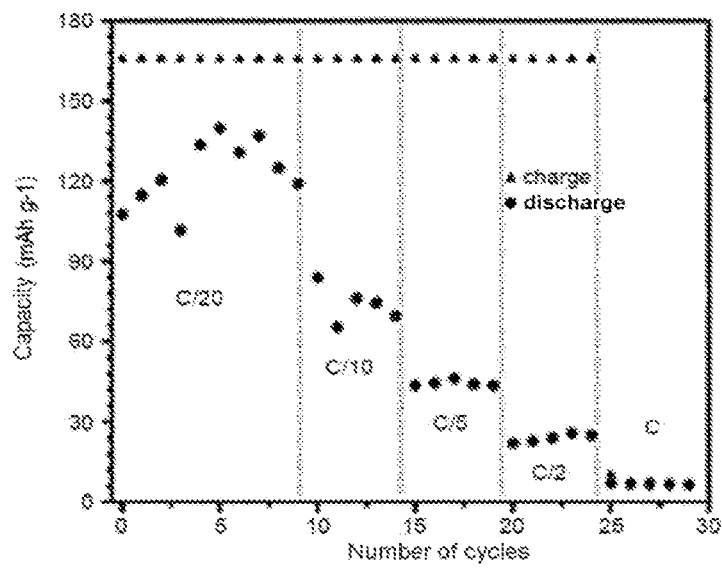
FIG. 5 shows the variation of the capacity of the cell that has undergone preconditioning according to the first embodiment as a function of the number of charge/discharge cycles, at different cycling rates.

After preconditioning of the cell, charge and discharge tests at the cycling rates C/20, C/10, C/5, C/2 and 1 C are carried out. The variation of the voltage as a function of the capacity of the cell and the variation of the capacity of the cell as a function of the number of charge/discharge cycles at the different rates are shown in FIG. 4 and FIG. 5, respectively.

The voltage profiles as a function of the capacity at cycling rates C/20 and C/10 show greater stability during charging relative to the cell in example 1, for which no preconditioning was carried out, reaching 3.9V and 3.8V respectively.

Voltage instability persists at cycling rates C/5 and C/2, but is nevertheless lower than in example 1 without preconditioning.

An average capacity of 120 mA.h.g$^{-1}$ is obtained on discharge at the cycling rate C/20, or 73% of the expected experimental capacity. This therefore represents a significant increase in capacity relative to a cell that has not been preconditioned.

The preconditioning as described in example 2 has thus made it possible to improve the performance of the cell.

EXAMPLE 3

1. Preparation of the Cell

The method of preparation of the cell described in detail in example 1 is reproduced for the method of preparation of the cell in example 3. Furthermore, a step of preconditioning of the cell, presented in more detail hereunder, is carried out.

Preconditioning

The cell is prepared according to a second embodiment of preconditioning. Five charge/discharge cycles are carried out at a first cycling rate of C/40 according to a first step (a). Each charge/discharge cycle of step (a) is carried out for 20 hours.

In a second step (b), five charge/discharge cycles are carried out at a second cycling rate of C/20, where each cycle is carried out for 10 hours.

In a third step (c), five charge/discharge cycles are carried out at a third cycling rate of C/10, where each cycle is carried out for 5 hours.

In a fourth step (d), five charge/discharge cycles are carried out at a fourth cycling rate of C/5, where each cycle is carried out for 2 hours.

In a fifth step (e), five charge/discharge cycles are carried out at a fifth cycling rate of C/2, where each cycle is carried out for 1 hour.

Figure 6:
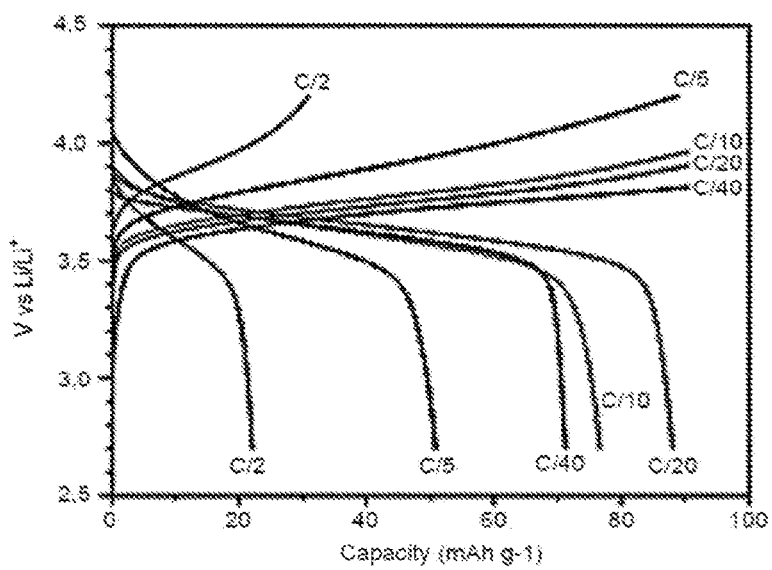
FIG. 6 shows the variation of the voltage as a function of the capacity of the cell during the cycling steps of preconditioning according to a second embodiment.

The variation of the voltage as a function of the capacity of the cell during the cycling steps of preconditioning according to the second embodiment is shown in FIG. 6. It can be seen that the results obtained during this preconditioning show very good stability in comparison with the results in example 1, but also an improvement relative to the stability of the cell in example 2. The voltage reached is 4.2V.

2. Galvanostatic Cycling, Evaluation and Result

Figure 7:
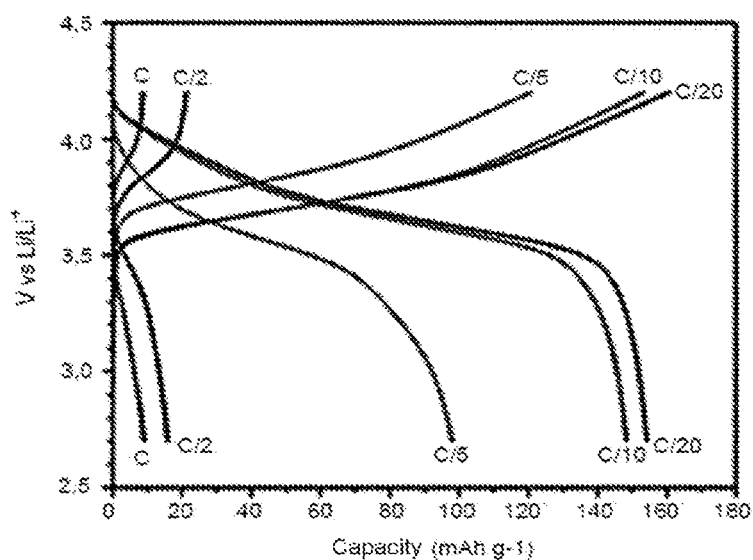
FIG. 7 shows the variation of the voltage as a function of the capacity of the cell that has undergone preconditioning according to the second embodiment, at different cycling rates.
Figure 8:
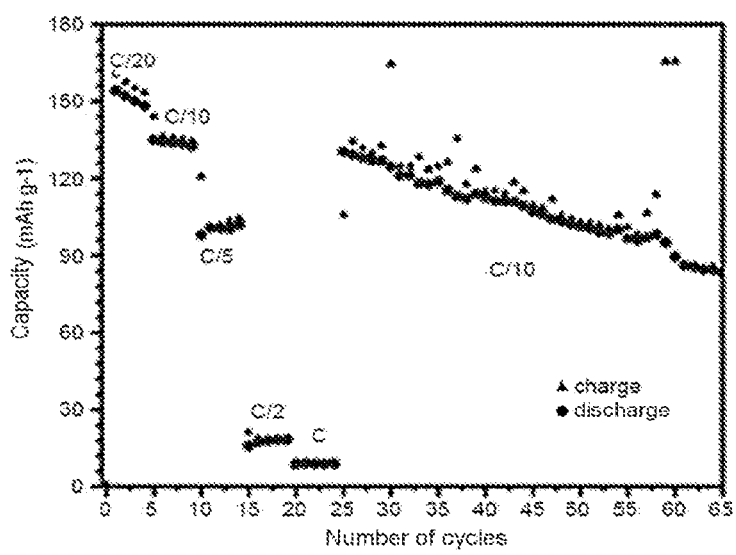
FIG. 8 shows the variation of the capacity of the cell that has undergone preconditioning according to the second embodiment as a function of the number of charge/discharge cycles, at different cycling rates.

After preconditioning of the cell, charge and discharge tests, at cycling rates C/20, C/10, C/5, C/2 and 1 C, are carried out. The variation of the voltage as a function of the capacity of the cell and the variation of the capacity of the cell as a function of the number of charge/discharge cycles at the different rates are shown in FIG. 7 and FIG. 8 respectively.

The potential of the cell may reach 4.2V in charging regardless of the charge rate, C/20 to C/2, polarization increasing for charge rate 1 C.

In discharge, an average capacity of 150 mA.h.g$^{-1}$ is obtained at cycling rate C/20, or 91% of the expected experimental capacity and 81% at C/10. The performance of the cell is thus clearly improved relative to the performance of the cell that has not undergone any preconditioning.

The invention claimed is:

1. A method for forming a lithium-ion battery cell comprising a cathode material, an anode material, and a solid electrolyte, the electrolyte comprising a mixture of a polyethylene oxide and an oxide of formula $Li_7La_3Zr_2O_{12}$, the method comprising the following successive cycling steps:
    (a) at least two successive charge/discharge cycles of the cell at a first cycling rate C/x, the charge/discharge steps being limited in time to x/2;
    (b) at least two successive charge/discharge cycles of the cell at a second charge rate C/y, different from the first cycling rate, where y is lower than x, the charge/discharge steps being limited in time to y/2; and (c) at least two successive charge/discharge cycles of the cell at a third cycling rate C/z different from the first and second charge rates, where z is lower than x and y, the charge/discharge steps being limited in time to z/2.

2. The method of formation as claimed in claim 1, wherein the first cycling rate is of C/40 applied for 20 h of charge/discharge.

3. The method of formation as claimed in claim 1, wherein the second cycling rate is of C/20 applied for 10 h of charge/discharge.

4. The method of formation as claimed in claim 1, wherein the third cycling rate is of C/10 applied for 5 h of charge/discharge.

5. The method of formation as claimed in claim 1, further comprising the following cycling step:
(d) at least two successive charge/discharge cycles of the cell at a fourth cycling rate different from the first, second and third charge rates.

6. The method of formation as claimed in claim 5, wherein the fourth cycling rate is of C/5 applied for 2.5 h of charge/discharge.

7. The method of formation as claimed in claim 5, further comprising the following cycling step:
(e) at least two successive charge/discharge cycles of the cell at a fifth cycling rate different from the first, second, third and fourth charge rates.

8. The method of formation as claimed in claim 7, wherein the fifth cycling rate is of C/2 applied for 1 h of charge/discharge.

9. The method of formation as claimed in claim 7, wherein one or more of the cycling steps (a), (b), (c), (d) and (e) comprise at least five successive charge/discharge cycles of the cell.

10. The method of formation as claimed in claim 1, wherein the successive cycling steps are carried out at an increasing cycling rate.

11. The method of formation as claimed in claim 1, wherein the electrolyte comprises lithium bis(trifluoromethanesulfonyl)imide LiTFSI.

12. The method of formation as claimed in claim 1, wherein the cathode comprises a catholyte comprising a mixture of polyethylene oxide and oxide $Li_7La_3Zr_2O_{12}$.

13. The method of formation as claimed in claim 12, wherein the catholyte comprises lithium bis(trifluoromethanesulfonyl)imide LiTFSI.

14. The method of formation as claimed in claim 1, further comprising a cathode comprising a mixture of nickel-manganese-cobalt active material, of carbon black and of catholyte comprising a mixture of polyethylene oxide and of $Li_7La_3Zr_2O_{12}$.

* * * * *